(12) United States Patent
Li

(10) Patent No.: US 6,928,245 B1
(45) Date of Patent: Aug. 9, 2005

(54) METHOD FOR CONFIGURING WDM RING OPTICAL NETWORKS

(75) Inventor: Fulu Li, Nepean (CA)

(73) Assignee: Nortel Networks Limited, (CA)

( * ) Notice: Subject to any disclaimer, the term of this patent is extended or adjusted under 35 U.S.C. 154(b) by 739 days.

(21) Appl. No.: 09/746,124

(22) Filed: Dec. 20, 2000

Related U.S. Application Data

(60) Provisional application No. 60/233,859, filed on Sep. 20, 2000.

(51) Int. Cl.[7] .............................................. H04J 14/02
(52) U.S. Cl. ........................... 398/79; 398/82; 398/83; 398/57; 398/58; 398/59; 370/254; 370/255; 370/258
(58) Field of Search .............................. 398/79, 83, 82, 398/59, 58, 57; 370/254, 255, 258

(56) References Cited

U.S. PATENT DOCUMENTS

| | | | |
|---|---|---|---|
| 6,396,852 B1 * | 5/2002 | Simmons | 370/535 |
| 6,667,981 B1 * | 12/2003 | Huang | 370/405 |

OTHER PUBLICATIONS

Gerstel, et al., "Wavelength Assignment in a WDM Ring to Minimize Cost of Embedded SONET Rings," IEEE, 1998, pp. 94-101.

Gerstel, et al., "Cost Effective Traffic Grooming WDM Rings," IEEE, 1998, pp. 69-77.

Barry, Richard A., "Models of Blocking Probability in All-Optical Networks With and Without Wavelength Changers," IEEE Journal on Selected Areas in Communications, vol. 14, No. 5, Jun. 1996, pp. 858-867.

Ramaswami, Rajiv, et al., "Design of Logical Topologies for Wavelength-Routed Optical Networks," IEEE Journal on Selected Areas in Communications, vol. 14., No. 5, Jun. 1996, pp. 840-851.

* cited by examiner

Primary Examiner—Hanh Phan
(74) Attorney, Agent, or Firm—Steubing McGuinness & Manaras LLP

(57) ABSTRACT

In accordance with a dynamic and recursive method, the number of required ADMs for a given set of light-paths in an OWDM ring network can be minimized. In one formulation of the minimum ADM problem, the method aims to create as many circular segments among the set of light-paths in the OWDM ring network as possible, and to form as few non-circular segments as possible from the remaining light-paths such that the number of shared ADMs can be maximized. In one example, the method of the invention operates in two phases: in the first phase, a dynamic and recursive searching for all the possible circular segments among the light-paths is employed, after which the concatenated circular segments are removed from further processing. Next, a reverse recursive searching among the remaining light-paths for concatenated non-circular segments with as many light-paths as possible is conducted.

23 Claims, 5 Drawing Sheets

METHOD FOR CONFIGURING WDM RING OPTICAL NETWORKS

CROSS-REFERENCE TO RELATED APPLICATION

The present application is based on, and claims priority from, U.S. Provisional Application No. 60/233,859, filed Sep. 20, 2000 and entitled "A Dynamic and Recursive Methodology on Minimizing ADMs in WDM Ring Optical Networks," commonly owned by the present assignee, the contents of which are incorporated herein by reference.

FIELD OF THE INVENTION

This invention relates generally to configuring an optical network and, more particularly, to a dynamic and recursive methodology for configuring a WDM ring optical network so as to minimize the required number of add/drop multiplexers employed in the ring network.

BACKGROUND OF THE INVENTION

Wavelength Division Multiplexing (WDM) networks are considered to be the most promising candidate for next generation backbone networks and WDM ring networks are being widely deployed by a growing number of telecom carriers to support Synchronous Optical Network (SONET)/Synchronous Digital Hierarchy (SDH) self-healing rings. WDM technologies allow carriers to build networks that scale in capacity to meet the unprecedented rate of growth of Internet traffic. These technologies provide fundamental data network architectures that are simple, low-cost and easy to manage.

As shown in FIG. 1A, the physical topology of a WDM ring network 100 consists of a plurality of optical nodes 102 and a plurality of bi-directional fiber links 104 there between. In this example, only one link 104 is shown between each node 102, but it should be apparent that there may be more than one and that the number of links between nodes need not be the same. Further, each link 104 is capable of transporting a limited number of wavelength channels. A node is considered to be capable of routing any incoming wavelength channel on any of the incoming links 104 to any wavelength channel on any of the outgoing fibers. In addition to such routing and switching functions, each node 102 may consist of several SONET/SDH add/drop multiplexers (ADMs).

As shown in FIG. 1B, between pairs of nodes 102 in the network and using links 104, light-paths 106 can be set up. As used herein, a light-path, also called optical path, represents a direct optical connection between a pair of nodes (not necessarily adjacent in the ring) without any intermediate electronics, including ADMs at any intermediate node. As shown in FIG. 1B, certain links 104 can carry more than one wavelength channel or light-path 106. Each wavelength channel or light-path represents traffic at a given optical wavelength traversing both the upstream and downstream directions. The way in which the wavelengths are assigned to a given set of light-paths is one of the most fundamental network design problems for WDM networks.

Recently, significant research has been performed to minimize the number of wavelengths needed for a given set of light-paths, or to minimize the number of blocked light-paths given a fixed number of wavelengths. However, from an engineering and economic perspective, unless the limit on the number of wavelengths is exceeded, the highest-priority optimization objective should be to minimize the overall network cost, rather than minimizing wavelengths and blocked light-paths. And overall network costs are mainly determined by the number of total required SONET add/drop multiplexers (ADMs), instead of the number of wavelengths, employed in the network. Further, according to dense WDM (DWDM) applications, as well as the recently completed ITU-T Recommendation G.692, the technology allows up to around 40 different wavelengths per fiber in the 1550 nm window with 100 GHz (about 0.8 nm) spacing in the flat operating gain band (1530–1560 nm) of the present Erbium-Doped Fiber Amplifiers (EDFA).

It has been reported that the minimum ADM problem is NP-complete, which means that there is no optimal solution for finding the minimum required ADMs for a given set of light-paths with a polynomial computational complexity. Rather, several heuristics have been proposed to minimize the number of ADMs in WDM ring networks. These proposals can broadly be categorized as either (1) solutions with light-paths splitting or (2) solutions without light-paths splitting.

As for the first category of proposals, an approach called Cut-First has been advanced. See O. Gerstel et al., "Wavelength Assignment in a WDM Ring to Minimize Cost of Embedded SONET Rings," Proc. of IEEE INFOCOM '98, March 1998, for details. However, proposals such as the Cut-First approach, that are based on light-paths splitting, are not desired because it requires that light-paths be split into several segments and that data be transferred electrically between the segments. Although this is a valid option for SONET rings, it involves higher port and cross-connect costs than approaches that do not require light-paths splitting due to the need for additional electro-optics conversions.

As for the category of proposals that do not require splitting of light-paths, a heuristic called Assign First was presented by O. Gerstel et al. The basic idea is that it initially assigns all light-paths that pass through a carefully selected node with unique wavelengths, and then greedily assign wavelengths to the remaining light-paths node by node. Further, in L. Liu et al., "Wavelength Assignment in WDM Rings to Minimize SONET ADMs," Proc. of IEEE INFOCOM '2000, March 2000, three greedy segmenting approaches were proposed, called Iterative Merging, Iterative Matching and Euler Cycle Decomposition. In the Iterative Merging approach, each light-path is initiated as an individual segment. At each iteration, three possible operations are performed in decreasing priority: (1) merge two noncircular segments into a circle segment, (2) split a noncircular segment into two noncircular segments and merge one of them with another noncircular segment into a circle segment, and (3) merge two noncircular segments into a larger noncircular segment. In the Iterative Matching approach, the segments are merged according to the maximum matching at a node based on a constructed bipartite graph, which indicates the set of segments ending at a node and the set of segments starting at a node. The Euler Cycle Decomposition method aims to find the best starting point by enumerating all possible starting points for an Eulerian circuit over the constructed uniform set of light-paths, aiming at the minimum number of noncircular segments for the decomposition of the Eulerian circuit.

It has been reported by L. Liu et al. through a set of randomized simulation studies that among all of the above heuristics, Iterative Merging demonstrates the best performance in general regarding the number of shared ADMs.

However, all the above conventional approaches are flawed in various respects. For example, all of the conventional approaches rely on static lookup methods which is a less than efficient way to solve the minimum ADM problem in WDM ring networks.

SUMMARY OF THE INVENTION

The present invention relates to a dynamic and recursive method for minimizing the number of required ADMs for a given set of light-paths in an OWDM ring network. In one formulation of the minimum ADM problem, the method aims to create as many circular segments among the set of light-paths in the OWDM ring network as possible, and to form as few non-circular segments as possible from the remaining light-paths such that the number of shared ADMs can be maximized. In one example, the method of the invention operates in two phases: in the first phase, a dynamic and recursive searching for all the possible circular segments among the light-paths is employed, after which the concatenated circular segments are removed from further processing. Next, a reverse recursive searching among the remaining light-paths for concatenated non-circular segments with as many light-paths as possible is conducted.

In accordance with one aspect of the invention, a method for configuring an optical network having a plurality of nodes and a plurality of light-paths between the nodes includes firstly grouping a first set of the light-paths into circular segments, and secondly grouping a second set of the light-paths into non-circular segments, the second set of the light-paths being a remainder of the plurality of light-paths less the first set of the light-paths.

In accordance with another aspect of the invention, the firstly grouping step includes the step of searching the plurality light-paths in a top-down fashion so that circular segments having fewer light-paths are grouped before circular segments having more light-paths, and the secondly grouping step includes the step of searching the remainder of the plurality of light-paths in a reverse top-down fashion so that non-circular segments having more light-paths are grouped before non-circular segments having fewer light-paths.

In accordance with another aspect of the invention, an optical network includes a plurality of nodes, and a plurality of light-paths between the nodes, wherein a first set of the light-paths are grouped into circular segments, and wherein a second set of the light-paths are =grouped into non-circular segments, the second set of the light-paths being a remainder of the plurality of light-paths less the first set of the light-paths.

BRIEF DESCRIPTION OF THE DRAWINGS

The present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the implementation of certain elements of the present invention may be accomplished using software, hardware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

The following describes a Dynamic and Recursive Methodology (DRM) in accordance with certain aspects of the invention for minimizing the required number of ADMs in WDM ring networks. In the DRM scheme described below, it is assumed that light-paths are not allowed to be split.

Figure 1A:
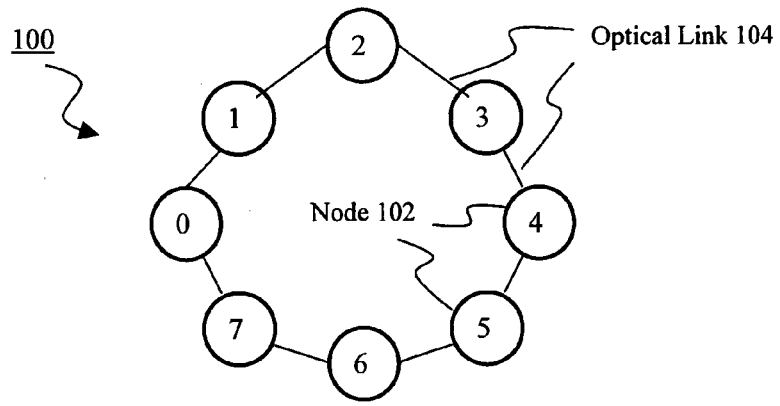
FIGS. 1A and 1B illustrate an example topology of a WDM ring optical network.

Referring back to FIGS. 1A and 1B and as discussed above, an optical WDM ring network 100 (e.g. SONET/SDH ring) consists of a number of optical nodes 102 and bi-directional fiber links 104. Between any pair of nodes 102, there can be a light-path 106. A light-path 106 is a direct node-to-node optical connection, which is handled completely in the optical domain without any electrical conversion during transmission.

For the purposes of the following descriptions, it is assumed that the light-paths are already routed. Accordingly, these descriptions focus on the static wavelength assignment problem, where the set of light-paths is given a priori. This tends to be the main mode of operation for WDM, as in very high-speed pipes in the telecom environment.

For any wavelength assignment among the light paths 106, the following theorem applies:

Theorem 1: The wavelength assignment to a set of light-paths is valid only if all overlapping light-paths are assigned different wavelengths. Two light-paths are overlapping if and only if those two light-paths cross at least two of the same optical nodes (including the origin and termination nodes).

As a corollary to Theorem 1, it can be seen that a wavelength channel can be shared by multiple light-paths in a WDM ring if they are not overlapping each other.

Let N denote the number of nodes in a given WDM ring topology. Those nodes are labeled from 0 to N−1. Let P stand for the set of light-paths and $P_i$ be the $i^{th}$ light-path in the set, which can also be represented by the node pair ($s_i$, $t_i$) where $s_i$ is the starting node point and $t_i$ is the terminating node point for the $i^{th}$ light-path in a clockwise direction.

Figure 1B:
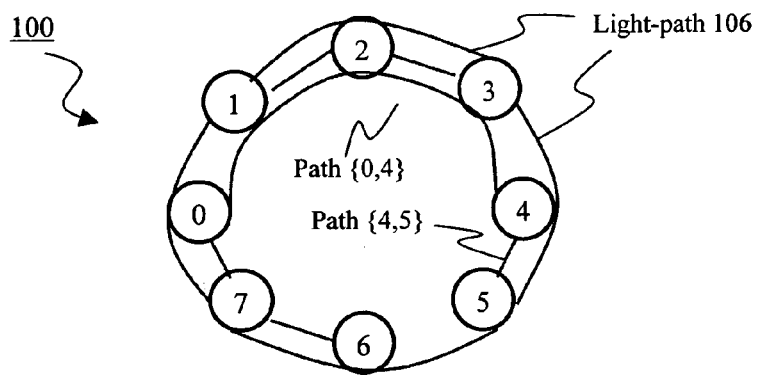

In the example WDM ring network topology shown in FIG. 1B, the number of optical nodes N is 8. The number of light-paths $\|P\|=10$, where P={(0,4), (1,2), (1,3), (2,3), (3,5), (4,5), (5,7), (6,7), (7,1), (7,0)}.

In principle, each light-path 106 within ring network 100 requires two ADMs at the two ends (one at the starting node and another at the terminating node). However, it is possible for two adjacent light-paths in the same SONET ring (i.e., two light-paths with the same wavelength, one terminating and the other starting at the same node), to share one ADM at their common optical node. For example, as shown in FIG. 1B, it is possible for light-path {0,4} and light-path {4,5} to share an ADM at their common node 4 if both light paths are assigned the same wavelength.

Moreover, in a special case, if two or more adjacent light-paths span the entire ring, then the light-paths share ADMs at each of their common ends/connection nodes, and the total number of required ADMs for these light-paths will equal the number of adjacent light paths.

In accordance with an aspect of the present invention, when assigning wavelength channels to a given set of light-paths, an objective is to minimize the total number of required ADMs. For a given OWDM ring network and set of light-paths, let $R_{ADM}$ stand for the total number of required ADMs, whereas $S_{ADM}$ denotes the number of shared ADMs (i.e. ADMs shared by two adjacent light-paths). The following theorem sets forth the relationship between $R_{ADM}$ and $S_{ADM}$ for any given wavelength assignment:

Theorem 2: Given a set of light-paths, for any wavelength assignment, the sum of the number of required ADMs and the number of shared ADMs is equal to twice the number of light-paths, that is:

$$\|P\| \times 2 = R_{ADM} + S_{ADM} \quad \text{(Eq. 1)}$$

As mentioned before, an objective for any given wavelength assignment to a given set of light-paths is to minimize the required number of ADMs, i.e., $R_{ADM}$. It should be noted that, for a given set of light-paths P, the number of light-paths, i.e., $\|P\|$, is a constant. By rewriting Eq. 1 as follows, $$R_{ADM} = (\|P\| \times 2) - S_{ADM} \quad \text{(Eq. 1a)}$$

it can thus be seen that the objective can be equivalently stated as to maximize the number of shared ADMs, i.e., $S_{ADM}$. This is because the total number of required ADMs is reduced by one for each shared ADM in the network.

As further set forth above, if a sequence of light-paths can be concatenated together to span the entire circular ring, the total number of required ADMs for that sequence of light-paths is exactly equal to the number of light-paths, instead of two ADMs for each light-path as discussed before (one at the starting node and one at the terminating node). Thus, concatenating the light-paths into as many circular rings as possible is an efficient way to minimize the total number of required ADMs. From Theorem 1, it is also noted that any two overlapping light-paths cannot share an ADM.

As used herein, a segment is referred to as a sequence of concatenated light-paths in which the termination of a light-path (except the last one) is the origin of the subsequent light-path, and in which no two light-paths in the sequence overlap with each other. As further used herein, a segment is referred to as a circular segment if the termination node of the last light-path in the segment is also the origin node of the first light-path in the segment. In other words, a circular segment spans the entire ring. As still further used herein, a segment which does not form a ring, is referred to as a non-circular segment. For a circular segment, the number of required ADMs is equal to the number of light-paths in the segment, while the number of required ADMs for a non-circular segment is one more than the number of light-paths in the segment.

For a given set of light-paths, suppose the number of formed circular segments is $S_{CIR}$, the number of formed non-circular segments is $S_{NCIR}$, and the respective light-paths subsets for circular segments and non-circular segments are $P_{CIR}$ and $P_{NCIR}$. It can then be seen that:

$$R_{ADM} = \|P_{CIR}\| + (\|P_{NCIR}\| + S_{NCIR}) = (\|P_{CIR}\| + \|P_{NCIR}\|) + S_{NCIR} \quad \text{(Eq. 2)}$$

So $$R_{ADM} = \|P\| + S_{NCIR} \quad \text{(Eq. 3)}$$

In accordance with an example of the present invention, from Theorem 1, Theorem 2 and the definition of a segment, a solution to the minimum-required ADMs problem for a given wavelength assignment involves grouping the light-paths into segments such that as many circular segments are formed as possible (i.e., the number of non-circular segments is as small as possible). Wavelength channels can then be assigned to the segments thus created, which is the well-studied circular-arc-coloring problem and does not alter the number of required ADMs.

Figure 2:
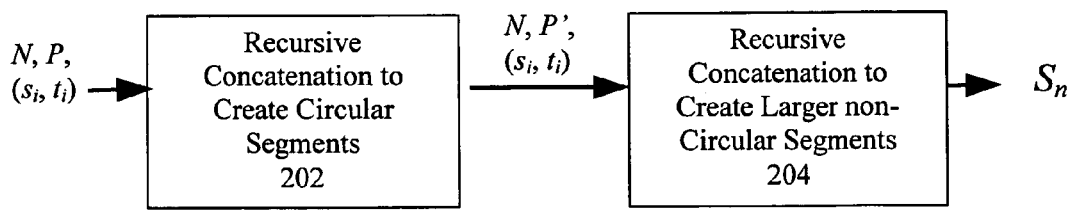
FIG. 2 is an overall block diagram illustrating an example process flow for minimizing the number of required ADMs in a ring network in accordance with an embodiment of the invention.

FIG. 2 is an overall block diagram illustrating an example process flow for minimizing the number of required ADMs in a ring having a given number of nodes N, and set of light-paths P, each light path having a starting and terminating node pair $(s_i, t_i)$ ($i=1$ to $\|P\|$) in accordance with one embodiment of the invention.

As shown in FIG. 2, the process consists of two main blocks. In the first block 202, a dynamic and recursive process is executed to search for all the possible concatenated circular segments in a top-down fashion and output each circular segment whenever a concatenated circular segment is formed. The set of light-paths is first checked to determine if there is any light-path that spans the entire ring by itself. Then, the set is checked to determine if there are any two light-paths that can be concatenated together to form a ring. This process is repeated, wherein after each round of searching, the number of light-paths that can be concatenated together to form a ring is incremented by one. The circular-segment searching phase will stop when the number of light-paths that form a ring reaches N, i.e., the number of nodes in the given WDM ring network. At this point, if any circular segments were found, there is a set of circular segments $S_n$ ($n=1$ to $S_{CIR}$). Also, the light-paths corresponding to any identified circular segments are removed from further processing, indicated by the set P' provided as an input to the next block.

In the second block 204, the remaining light-paths are concatenated into the largest possible number of non-circular segments in a reverse recursive fashion as compared with the first step. First, the set of remaining light-paths is checked to determine if there are any (N−1) light-paths that can be concatenated together to form a large non-circular segment. Then, the set is checked to determine if there are any (N−2) light-paths that can be concatenated together to form a large non-circular segment. This process is repeated for successively smaller non-circular segments, and the operation will stop after checking if there are any two light-paths that can be concatenated together to form a non-circular segment. Any remaining light-paths after the process are identified as separate segments, yielding a total number of $S_{NCIR}$ non-circular segments. At the end of the first and second processes there are a set of $S_n$ segments ($n=1$ to $(S_{CIR}+S_{NCIR})$).

It should be noted that, after the set of $S_n$ segments are identified, a unique wavelength can be assigned to each in accordance with an OWDM scheme. Accordingly, each of the light-paths belonging to the segment can carry traffic using that unique wavelength. This is because, by virtue of the present invention's adherence to Theorem 1, none of the light-paths belonging to the identified segments overlaps another.

Figure 3:
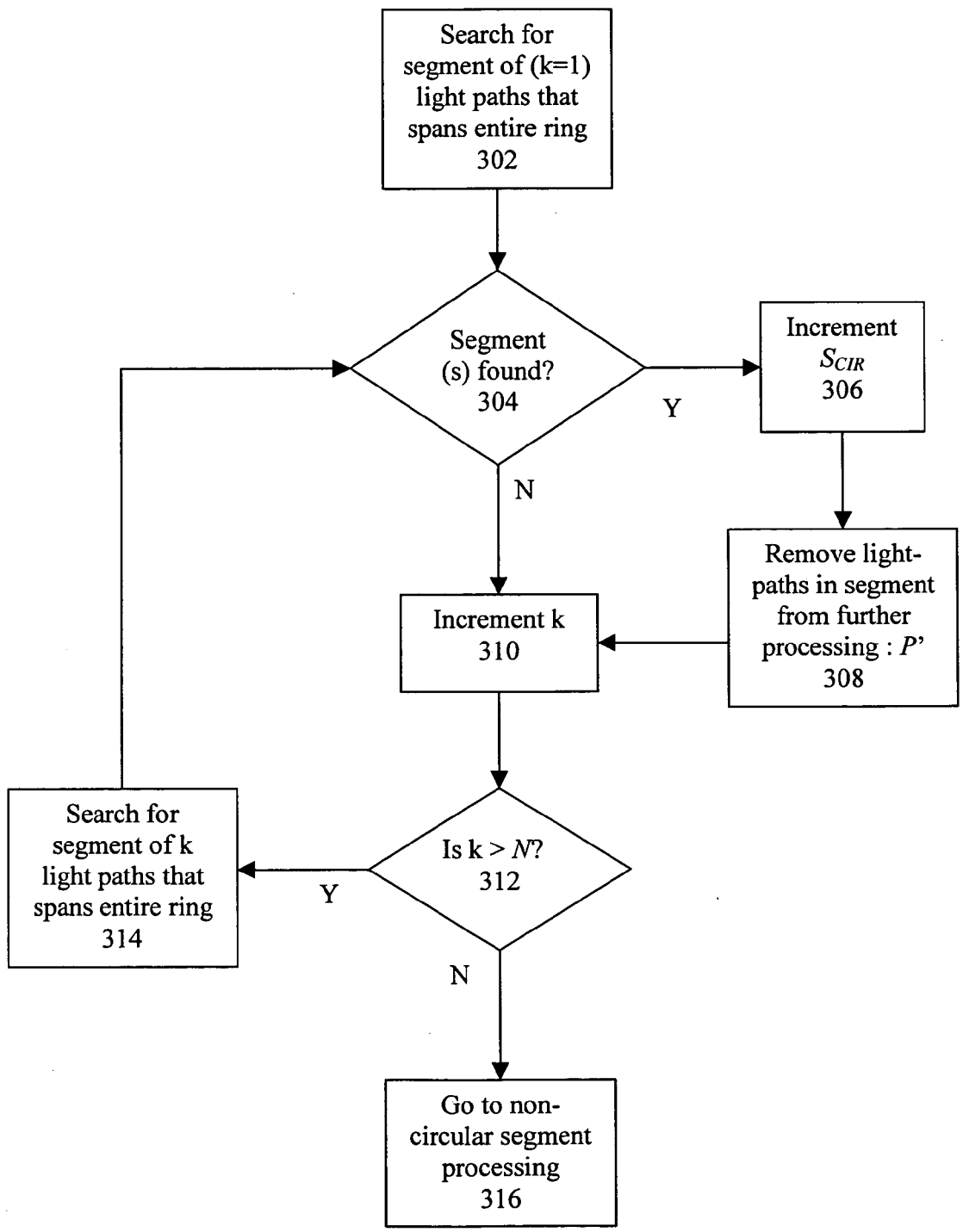
FIG. 3 is a flowchart further illustrating an example of processing performed in the first block of FIG. 2 in accordance with an embodiment of the invention.

FIG. 3 is a flowchart further illustrating the processing performed in the first block 202.

As shown in FIG. 3, processing begins in block 302 by first searching the set of light-paths P for a single light-path (i.e. a segment having k=1 light-paths) that spans the entire ring (i.e. a light-path that has a starting and terminating node as the same node). If such a segment is found (determined in block 304), it is identified as a circular segment and the number of circular segments $S_{CIR}$ is incremented (block 306). It should be noted that there can be more than one segment having k=1 light-paths that span the entire ring, each perhaps beginning and ending at different nodes in the ring. Each of the light paths forming these segments is removed from the set P that is available for further processing (block 308).

Processing continues at block 310 where k is incremented by 1. In other words, the number of light-paths that can be combined in a concatenated segment of adjacent light-paths to form a circular segment is increased by one light-path. First, it is checked whether the value of k exceeds the total number of nodes N (block 312). If not, processing continues to block 314, where the set of light-paths P' is checked to determine if there are any concantenation(s) of k light-paths that span the entire ring, and further processing is repeated as described above. If not, processing of circular segments ends and non-circular segment processing is begun (block 316).

Table 1 below contains pseudo-code for the above process:

TABLE 1

(1) i = 0, k = 1;
(2) Search P to find any circular segment with k light-paths;
(3) If (circular segment with k light-paths)
  { i = i + 1;
    Output circular segment $S_i$;
    Remove the k light-paths from P;
  }
(4) Go to step (2) until all the possible concatenations are checked.
(5) If (k < N)
  {
    k = k + 1;
    Go to step (2);
  }
(6) Proceed to non-circular segment process FIG. 4 is a flowchart further illustrating the processing performed in the second block 204.

Figure 4:
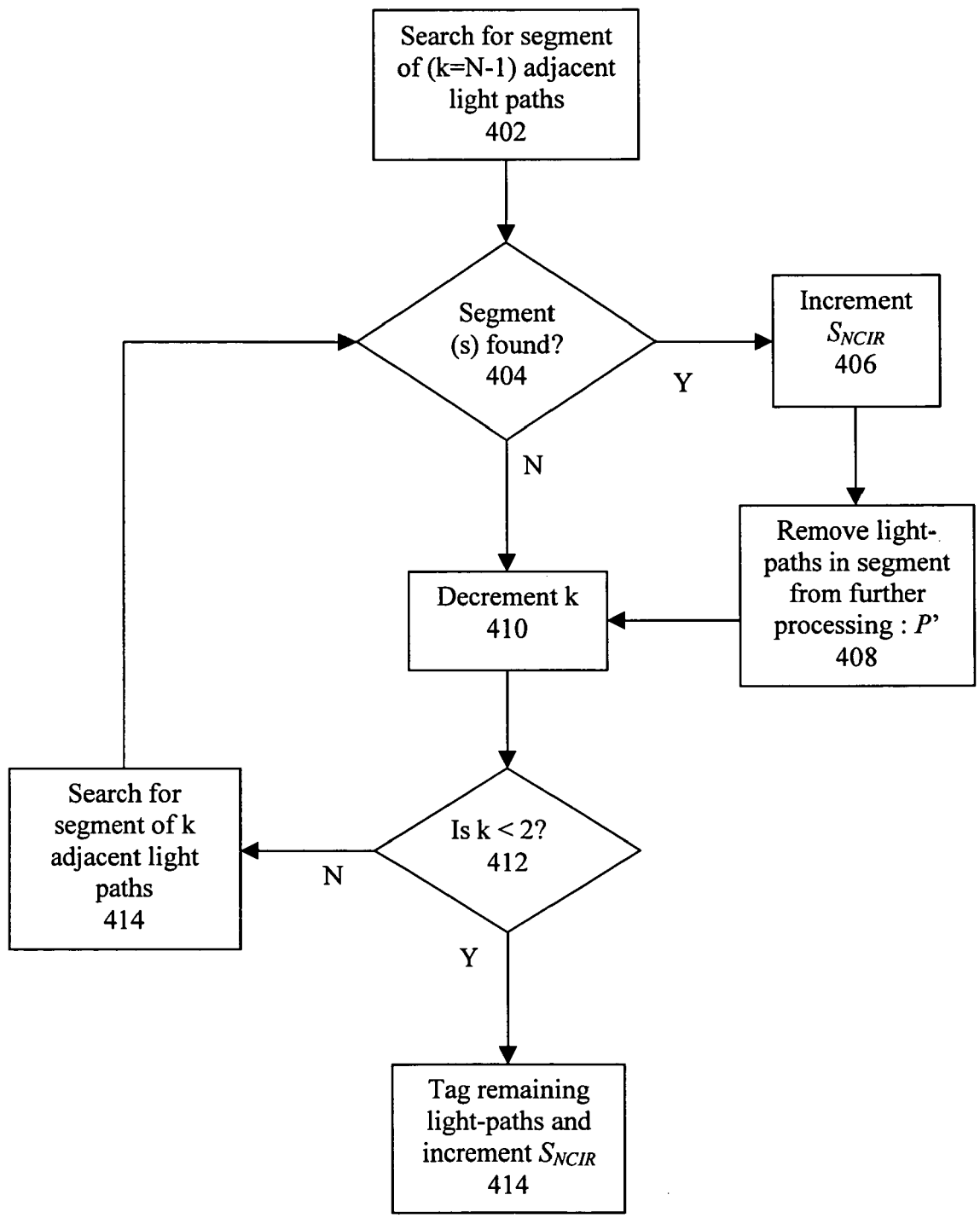
FIG. 4 is a flowchart further illustrating an example of processing performed in the second block of FIG. 2 in accordance with an embodiment of the invention.

As shown in FIG. 4, processing begins in block 402 by first searching the set of light-paths P' for a set of adjacent light-paths that fall short of spanning the entire ring by one node (i.e. the largest possible non-circular segment having k=N–1 light-paths). If such a segment is found (determined in block 404), it is identified as a non-circular segment and the number of non-circular segments $S_{NCIR}$ is incremented (block 406). It should be noted that there can be more than one segment having k=(N–1) light-paths, each perhaps beginning and ending at different nodes in the ring. Each of the light paths forming these segments is removed from the set P' that is available for further processing (block 408).

Processing continues at block 410 where k is decremented by 1. In other words, the number of light-paths that can be combined in a concatenated segment of adjacent light-paths to form a non-circular segment is decreased by one light-path. First, it is checked whether the value of k is less than 2 (block 412). If not, processing continues to block 414, where the set of light-paths P' is checked to determine if there are any concatenation(s) of k adjacent light-paths, and (further processing is repeated as described above. If not, non-circular segment processing ends by tagging the remaining single light-paths as non-circular segments and adjusting $S_{NCIR}$ accordingly.

Table 2 below contains pseudo-code for the above process:

TABLE 2

(7) k = N – 1;
(8) Search P' to find any non-circular segment with k light-paths;
(9) If (non-circular segment with k light-paths)
  { i = i + 1;
    Output non-circular segment $S_i$;
    Remove the k light-paths from P';
  }
(10) Go to step (8) until all the possible concatenations are checked.
(11) If (k > 2) k = k – 1;
(12) Go to step (8);
(13) If (P ≠ Φ) (i.e. if any light-paths remain that cannot be concatenated) Output each remaining light-path as a single non-circular segment.

The above described processes will now be described in connection with an example network as shown in FIGS. 5A to 5E.

Figure 5A:
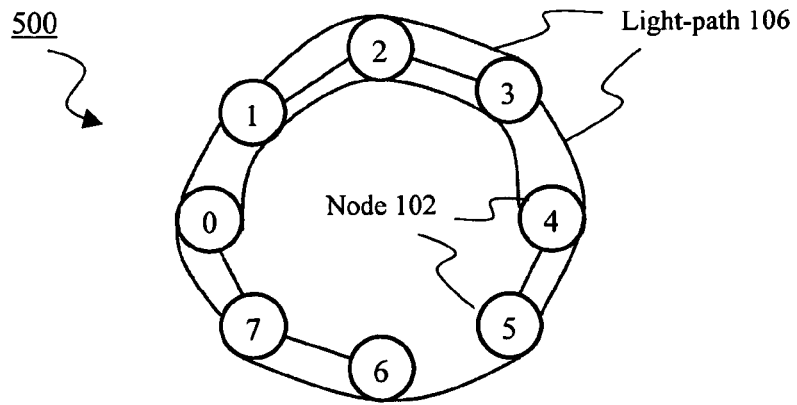
FIGS. 5A to 5E further illustrate an example of processing performed in the blocks of FIG. 2 in connection with an example network topology as shown in FIG. 1B.

FIG. 5A shows an example network 500 similar to network 100 as shown in FIG. 1B. In this example ring network, the number N of optical nodes 102 is 8 and the number ∥P∥ of light-paths 106 is 10, where P consists of the set of light paths each having a node pair $(s_i, t_i)$ (i=1 to ∥P∥) of a starting node and a terminating node such that P={(0,4), (1,2), (1,3), (2,3), (3,5), (4,5), (5,7), (6,7), (7,1), (7,0)}.

In the first process, the set P of light-paths is searched to identify any circular segments, starting with the segments that have the fewest number of light-paths (i.e. k=1). Accordingly, the light-paths are searched by going through each node and determining if any light-paths starting from that node spans the entire ring (i.e. ends at the same node at the starting node). For example, beginning at node 0, there is only one light-path that starts there (i.e. light-path (0,4)), but it terminates at node 4, and so it does not span the entire ring. Turning next in a clockwise direction to node 1, there are two-light paths that start there (i.e. light-paths (1,2) and (1,3)).

However, neither light-path also terminates at node 1, which would span the entire ring. This searching continues for each node 2 through 7 of the ring, and it is determined that there are no single light-paths 106 in the network 500 that span the entire ring.

Processing continues by incrementing by one the number of adjacent light-paths that can be concatenated together so as to span the entire ring. Accordingly, the set P of light-paths are searched by going through each node and determining if any light-paths starting from that node can be combined with an adjacent light-path so as to span the entire ring (i.e. the adjacent light-path ends at the starting node of the first light-path). Starting first at node 0, it is determined that there is only one light-path that starts there, and it terminates at node 4 (i.e. light-path (0,4)). Looking next at node 4, it is checked whether there are any single light-paths that start there end at node 0. However, only one light-path starts at node 4 (i.e. light-path (4,5)), and it terminates at node 5. Searching continues on for each node in the clockwise direction until node 7 is reached. At that point, it is determined that there are no two light-paths that can be concatenated together so as to span the entire ring.

Processing continues by searching the set of light-paths for any three adjacent light-paths that can be concatenated together in a segment that spans the entire ring. Similarly to the processing described above, there are no three light-paths that can be concatenated together in a segment that spans the entire ring.

Figure 5B:
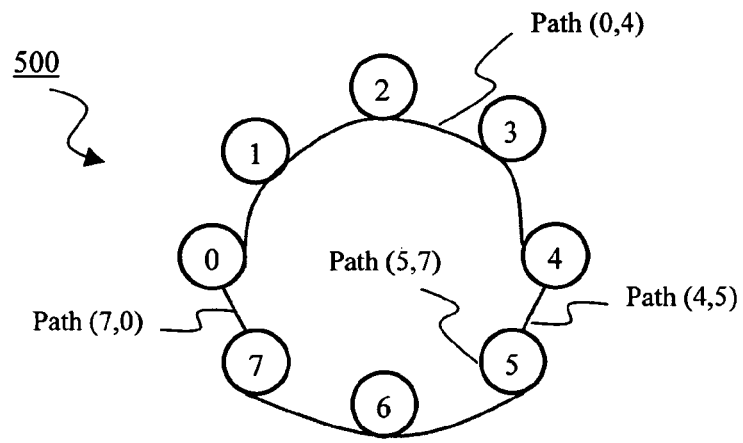

Different results are obtained when searching the set of light-paths for any four adjacent light-paths that can be concatenated together in a segment that spans the entire ring. As shown in FIG. 5B, when searching begins at node 0, it is determined that light-paths (0,4), (4,5), (5,7) and (7,0) can be concatenated together in one segment that spans the entire ring. Accordingly, the number of circular segments $S_{CIR}$ is incremented to 1. Further, the light-paths belonging to this circular segment are removed from the set of light-paths for future processing, resulting in the adjusted set P' shown in FIG. 5C.

Figure 5C:
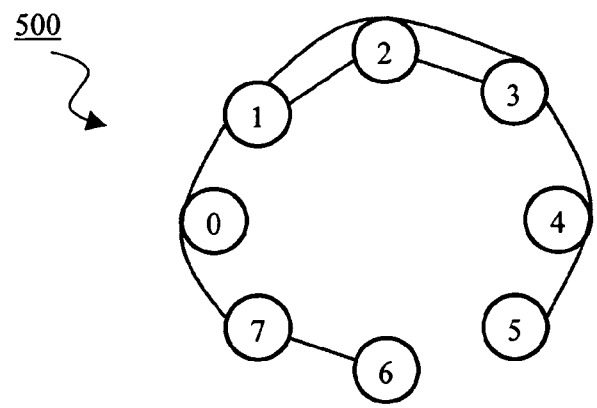

At this point, from FIG. 5C it should be apparent that there will be no more circular segments that can be identified due to the lack of any remaining light-path that spans nodes 5 and 6. Accordingly, as processing continues for segments of k=4, 5 6, 7 and 8 (=N) light-paths that can be concatenated together in a circular segment, such processing will fail. So, the circular segment processing ends in a single circular segment being identified ($S_{CIR}$=1).

Next, non-circular segment processing begins with the set of remaining light-paths shown in FIG. 5C.

Accordingly the set P' of light-paths is first searched to determine if there are any (k=N−1=7) adjacent light-paths that be concatenated together in a single segment. Looking first at node 0, there are no remaining light-paths that start from that node. Next looking at node 1, there is one remaining light-path that starts there (i.e. light-path (1,3)). However, the only adjacent light-path (i.e. light-path (3,5)) ends at node 5, and there are no other remaining light-paths that can be concatenated with those two light-paths in a clockwise direction. Similar results are obtained when looking at nodes 2 through 7, at which point it is determined that there are no (N−1=7) light-paths that can be concatenated together in a non-circular segment.

Non-circular segment processing continues by searching the set P' for (N−2=6) adjacent light-paths that can be concatenated together in a single segment. Looking at nodes 0 to 7 in succession, however, no such concatenation of N−2=6 light-paths can be found.

Figure 5D:
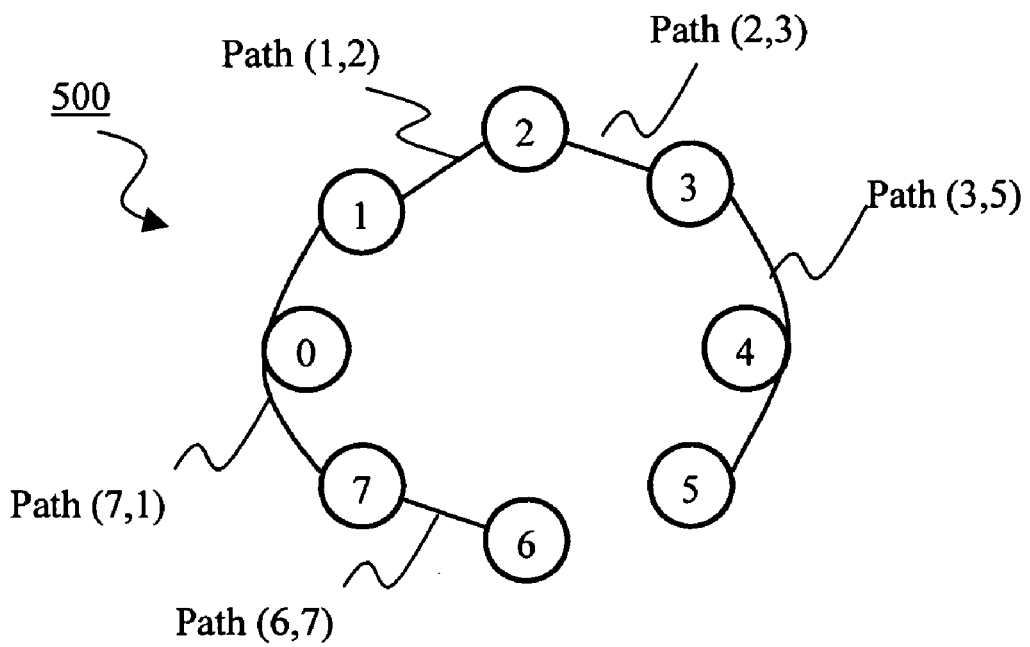

However, different results are obtained when searching the set P' for N−3=5 adjacent light-paths. As can be seen in FIG. 5D, when searching for N−3=5 adjacent light-paths advances to node 6, it will be seen that light-paths (6,7), (7,1), (1,2), (2,3) and (3,5) can be concatenated together into one non-circular segment. Accordingly, the number of non-circular segments $S_{NCIR}$ will be incremented to 1 and the identified light-paths will be removed from the set P' for further processing.

Figure 5E:
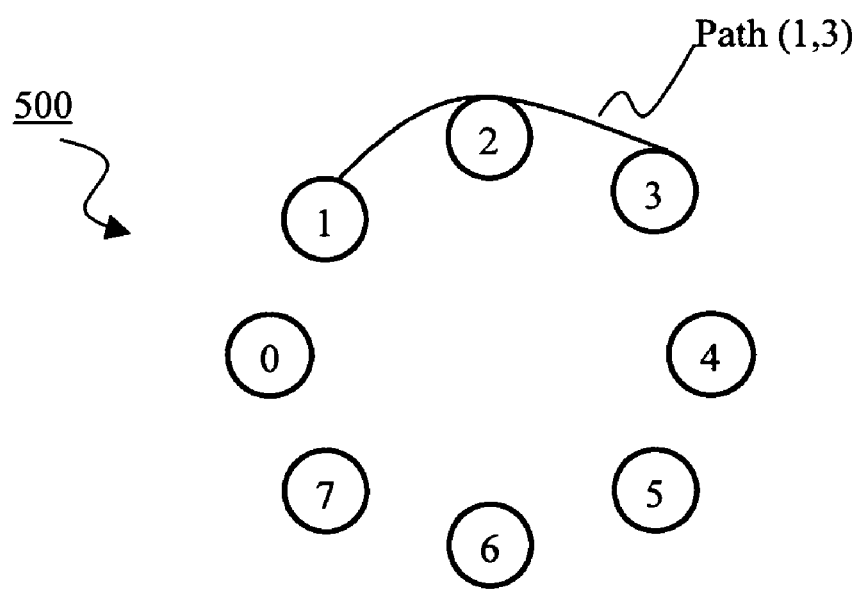

As shown in FIG. 5E, the only remaining light-path after this step is light-path (1,3). Accordingly, the remaining processing for successively searching for (N−3=5), (N−4=4), (N−5= 3) and (N−6=2) will be unsuccessful. After such processing, light-path (1,3) will be identified as the only remaining non-circular segment.

From the foregoing descriptions, it can be seen that as a result of the processing on network 500 that one circular segment consisting of light-paths (0,4), (4,5), (5,7) and (7,0) will be identified and that two non-circular segments, one consisting of light-paths (6,7), (7,1), (1,2), (2,3) and (3,5) and the other consisting of light-path (1,3) will be identified. This leaves the number of non-circular segments as $S_{NCIR}$=2, and thus the number of required ADMs $R_{ADM}$ as 12 (∥P∥=10+2, from Eq. 3). This can be further seen by adding together the number of ADMs that will be required for the circular segment, which equals the number of light-paths in the segment (i.e. 4), and the number of ADMs for the non-circular segments, which will equal the number of light-paths in those segments plus one each (i.e. (5+1=6) and (1+1=2)). Accordingly, the processing of the present invention has reduced $R_{ADM}$ from its theoretical maximum of ∥P∥×2=20 by 8 ADMs.

It should be further noted that unique wavelengths can be assigned to each segment identified by the above processing in accordance with an OWDM scheme. For example, a first wavelength can be assigned to the circular segment comprising light-paths (0,4), (4,5), (5,7) and (7,0), a second wavelength can be assigned to non-circular segment comprising light-paths (6,7), (7,1), (1,2), (2,3) and (3,5), and a third wavelength can be assigned to the remaining non-circular segment comprising light-path (1,3). Accordingly, traffic along the light-paths in the network can be carried using the first, second and third wavelengths as assigned to the light-paths above.

It should be noted that variations on the above scheme can be made. For example, some formed circular segments could be de-concatenated to re-create more circular segments with other non-circular segments, thus possibly decreasing the number of non-circular segments and the number of required ADMs. However, the chances of this opportunity arising is believed to be minimal under most circumstances due to the recursive nature of the above approach.

Further comparing the present scheme with the static merging and splitting operations of the Iterative Merging scheme of the prior art, it can be seen that the present scheme dynamically searches the possible concatenated circular segments in a delicate recursive fashion. It first looks up and outputs the formed circular segments with beginning with the fewest light-paths such that more light-paths can be left to form more circular segments. In the second phase of the scheme, it dynamically concatenates several light-paths into larger non-circular segments in a reverse recursive fashion as compared with the first phase. It first looks up and outputs the concatenated non-circular segments with as many light-paths as possible such that less non-circular segments could be formed to cover all the light-paths. Essentially, all the cases checked by Iterative Merging approach are only a subset of cases examined by the present scheme. Thus, the present scheme always gets better performance results than Iterative Merging due to the present scheme's dynamic and recursive approach, which yields a more exhaustive and efficient identification of segments.

As further compared with the static merging and splitting operations of Iterative Merging approach, the present scheme may be relatively slower due to its dynamic searching for all the possible concatenated circular segments and its strict recursive fashion. However, the operations of the present scheme can be greatly accelerated by storing some intermediate searching results for the next-round searching. Moreover, it is assumed that the light-paths are already routed and that the focus is the static wavelength assignment for the given light-paths. Thus, this operation can be normally done off-line. Further, the number of nodes, i.e., N, in a typical WDM ring network is relatively small (e.g. N=16 nodes as the recommended maximal number of nodes for SONET rings). Thus, the number of possible light-paths for a WDM ring network is less than 256. Thus, the computational complexity of the present scheme is fact feasible and acceptable for real-life applications even without further optimizations to speed up its operation.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims include such changes and modifications.

What is claimed is:

1. A method for configuring an optical network having a plurality of nodes and a plurality of light-paths between the nodes, comprising the steps of:
   recursively searching the plurality of light paths to identify possible circular segments;
   identifying, from the possible circular segments, a first set of light paths which yield the greatest number of circular segments;
   firstly concatenating together the first set of the light-paths into circular segments; and
   secondly concatenating together a second set of the light-paths into non-circular segments, the second set of the light-paths being comprised of a remainder of the plurality of light-paths less the first set of the light-paths.

2. A method according to claim 1, wherein the firstly and second concatenating steps are performed so that no light-path in any of the circular segments and non-circular segments overlaps another light-path in the same circular segment and non-circular segment.

3. A method according to claim 1, wherein the circular segments comprise at least one of the plurality of light-paths, a starting node of tte at least one light-path and a terminating node of the at least one light-path being the same one of the plurality of nodes.

4. A method according to claim 3, wherein the circular segments comprise at least first and second ones of the plurality of light-paths, a terminating node of the first light-path and a starting node of the second light-path being the same one of the plurality of nodes.

5. A method according to claim 1, wherein the non-circular segments comprise at least one of the plurality of light-paths, a starting node of the at least one light-path and a terminating node of the at least one light-path being different ones of the plurality of nodes.

6. A method according to claim 5, wherein the non-circular segments comprise at least first and second ones of the plurality of lit-paths, a terminating node of the first light-path and a starting node of the second light-path being the same one of the plurality of nodes.

7. A method according to claim 1, wherein the firstly concatenating step includes the step of searching the plurality light-paths in a top-down fashion so that circular segments having fewer light-paths are concatenated together before circular sets having more light-paths.

8. A method according to claim 1, wherein the secondly concatenating step includes the step of searching the remainder of the plurality of light-paths in a reverse top-down fashion so that non-circular segments having more light-paths are concatenated together before non-circular segments having fewer light-paths.

9. A method according to claim 1, wherein the firstly concatenating step includes the steps of:
   firstly determining whether any N of the light-paths can be concatenated together to form one of the circular segments, wherein N is greater than or equal to one;
   adding the any N light-paths determined in the firstly determining step to the first set of the light-paths;
   secondly determining whether any N+M of the light-paths, less the any N light-paths added to the first set of the light-paths, can be concatenated together to form another of the circular segments wherein M is greater than or equal to one; and
   adding the any N+M light-paths determined in the secondly determining step to the first set of the light-paths.

10. A method according to claim 1, wherein the secondly concatenating step includes the steps of:
    firstly determining whether any N of the remainder of the plurality of light-paths can be concatenated together to form one of the non-circular segments, wherein N is less than or equal to a number of the plurality of nodes;
    adding the any N light-paths determined in the firstly determining step to the second set of the light-paths;
    secondly determining whether any N–M of the remainder of the plurality of light-paths, less the any N light-paths added to the second set of the light-paths, can be concatenated together to form another of the no-circular segments, wherein M is greater than or equal to one; and
    adding the any N–M light-paths determined in the secondly determining step to the second set of the light-paths.

11. A method according to claim 9, wherein the secondly concatenating step includes the steps of:
    thirdly determining whether any J of the remainder of the plurality of light-paths can be concatenated together to form one of the non-circular segments, wherein J is less than or equal to a number of the plurality of nodes;
    adding the any J light-paths determined in the thirdly determining step to the second set of the light-paths;
    secondly determining whether any J–K of the reminder of the plurality of light-paths, less the any J light-paths added to the second set of the light-paths, can be concatenated together to form another of the non-circular segments, wherein K is greater than or equal to one; and
    adding the any J–K light-paths determined in the secondly determining step to the second set of the light-paths.

12. A method according to claim 1, wherein the firstly and secondly concatenating steps are performed so that a number of the non-circular segments is minimized.

13. A method according to claim 1, further comprising the step of:
    assigning a respective unique wavelength to each of the circular segments and non-circular segments in accordance with an OWDM scheme.

14. An optical network comprising:
    a plurality of nodes; and
    a plurality of light-paths between the nodes;
    program code operative to recursively search the plurality of light paths to identify possible circular segments; and
    program code operative to identify from the possible circular segments a first set of light paths which yield the greatest number of circular segments;
    program code operative to concatenate together the first set of the light-paths into circular segments, and
    wherein a second set of the light-paths are concatenated together into non-circular segments, the second set of the light-paths being a remainder of the plurality of light-paths less the first set of the light-paths.

15. An optical network according to claim 14, wherein the first set of light-paths are concatenated together by searching the plurality light-paths in a top-down fashion so that circular segments having fewer light-paths are concatenated together before circular segments having more light-paths.

16. An optical network according to claim 14, wherein the second set of light-paths are concatenated together by searching the remainder of the plurality of light-paths in a reverse top-down fashion so that non-circular se having more light-paths are concatenated together before non-circular segments having fewer light-paths.

17. An optical network according to claim 14, wherein a number of the non-circular segments is minimized.

18. An optical network according to claim 14, wherein each of the light-paths concatenated together in the circular segments and non-circular segments are assigned respective unique wavelengths in accordance with an OWDM scheme.

19. An optical network according to claim 14, wherein no light-path in any of the circular segments and non-circular segments overlaps another light-path in the same circular segment and non-circular segment.

20. An optical network according to claim 14, wherein the circular segments comprise at least one of the plurality of light-paths, a starting node of the at least one light-path and a terminating node of the at least one light-path being the same one of the plurality of nodes.

21. An optical network according to claim 20, wherein the circular segments comprise at least first and second ones of the plurality of light-paths, a terminating node of the first light-path and a starting node of the second light-path being the sane one of the plurality of nodes.

22. An optical network according to claim 14, wherein the non-circular segments comprise at least one of the plurality of light-paths, a starting node of the at least one light-path and a terminating node of the at least one light-path being different ones of the plurality of nodes.

23. An optical network according to claim 22, wherein the non-circular segments comprise at least first and second ones of the plurality of light-paths, a terminating node of the first light-path and a node of the second light-path being the same one of the plurality of nodes.

* * * * *